United States Patent [19]
Field

[11] 4,334,446
[45] Jun. 15, 1982

[54] CUTTING TOOL AND HOLDER THEREFOR

[75] Inventor: Peter Field, Miami, Fla.

[73] Assignee: Approved Performance Tooling, Inc., Troy, Mich.

[21] Appl. No.: 166,717

[22] Filed: Jul. 7, 1980

[51] Int. Cl.³ ................... B23B 27/16; B23B 27/22
[52] U.S. Cl. ............................. 82/36 R; 407/40; 408/233
[58] Field of Search .............. 408/233; 407/40, 50, 407/100, 110; 82/36 R

[56] References Cited

U.S. PATENT DOCUMENTS

| | | | |
|---|---|---|---|
| 3,027,786 | 4/1962 | Severson | 407/40 |
| 3,066,385 | 12/1962 | Vana | 407/110 |
| 3,546,761 | 12/1970 | Gage | 407/50 |
| 3,551,978 | 1/1971 | Berry | 407/40 |
| 4,060,335 | 11/1977 | Holloway et al. | 408/233 |

FOREIGN PATENT DOCUMENTS

| | | | |
|---|---|---|---|
| 197804 | 4/1978 | Fed. Rep. of Germany | 408/233 |
| 2044012 | 5/1979 | Fed. Rep. of Germany | 408/713 |

*Primary Examiner*—Leonidas Vlachos
*Attorney, Agent, or Firm*—Krass, Young & Schivley

[57] ABSTRACT

A cutting tool assembly comprises a cutting tool having a plurality of cutting edges which is held in a desired cutting position by a tool holder. The tool holder comprises an elongate body having a bifurcated end defining a pair of spaced tool gripping members and a tool receiving opening between which the cutting tool is releasable clamped in a vise like action. Each of the tool gripping members include a pair of opposed contoured faces each having a retaining wall for complementally abutting certain cutting edges of the tool in order to prevent rotation of the cutting tool relative to the holder. One edge of the cutting tool extends outwardly beyond the holder adjacent one corner of the tool receiving slot so as to be disposed in cutting relationship to the workpiece which is to be cut. The holder includes an inclined face immediately adjacent the exposed cutting edge of the tool and in blocking relationship to chips cut from the workpiece in order to deflect and eventually break the chips as they are removed from the workpiece. The cutting tool may be removed from the holder by simple loosening a clamping screw which controls the spacing between the gripping members, without the need for completely removing such screw.

3 Claims, 4 Drawing Figures

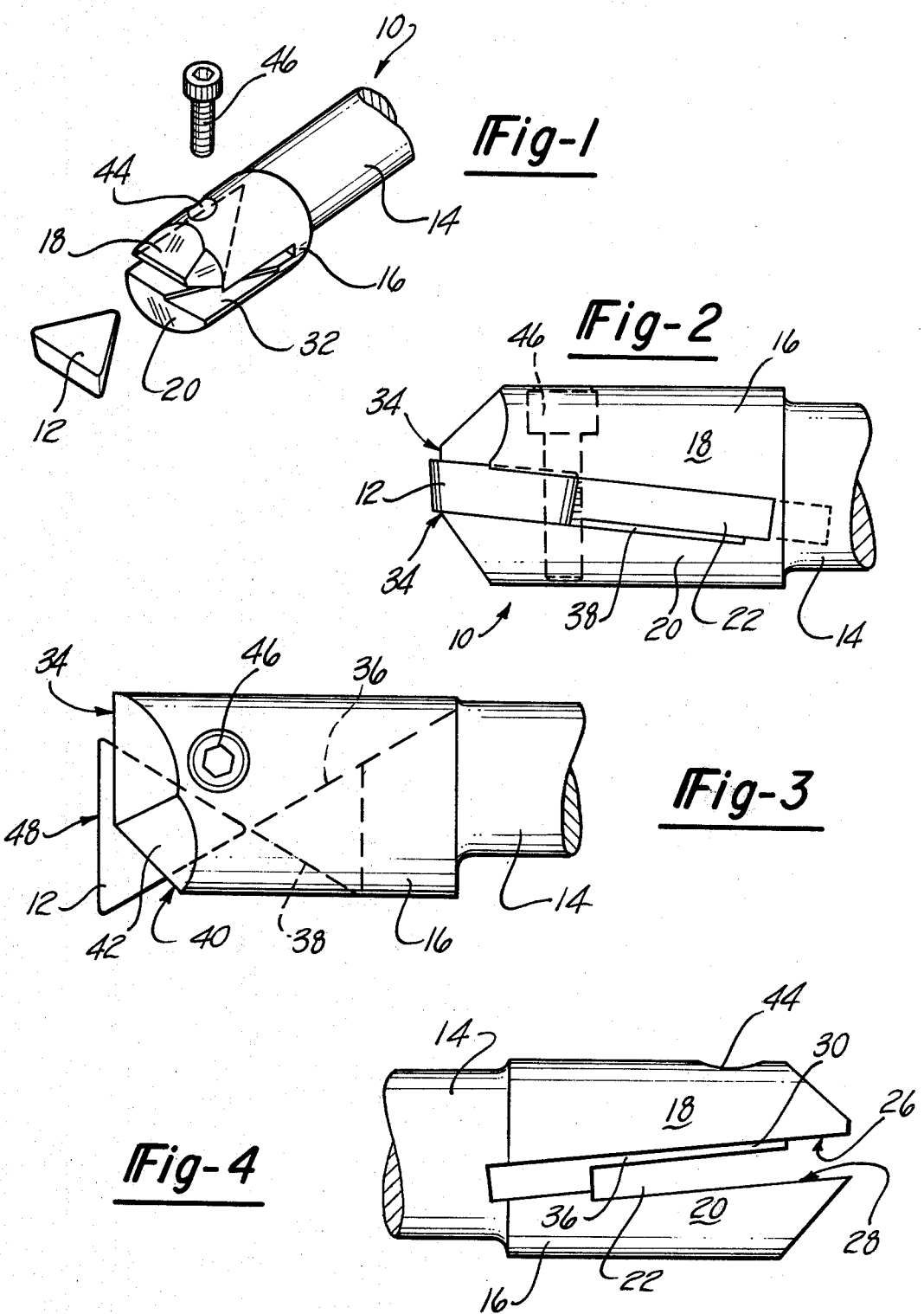

CUTTING TOOL AND HOLDER THEREFOR

TECHNICAL FIELD

The present invention generally relates to tools and tool holders such as those employed in boring and cutting machines, and deals more particularly with a cutting tool holder for releasably mounting a cutting tool insert in a cutting position on such machines.

BACKGROUND ART

Cutting tools employed for use in precision machine tools are typically manufactured from high strength steels and are adapted to be rigidly mounted in order to eliminate cutting error due to vibration or deflection of the cutting tool. Since cutting tools wear or grow dull after a period of use, such tools are normally manufactured in the form of a cutting tool insert which is removably mounted in a tool holder. For example, U.S. Pat. Nos. 3,238,600 and 3,310,859 disclose a cutting tool assembly in which a cutting tool insert having a plurality of cutting edges is releasably held by a cutting tool holder. The cutting tool insert has an aperture therethrough for receiving a retaining screw which is threadably received in the holder and locks the insert in wedged relationship between a pair of seats defined in one side of the holder.

The cutting tool holder disclosed in the patents mentioned above is relatively massive and is therefore costly from a production standpoint. This type of holder is also relatively expensive to produce since cutout areas must be machined in the side of the holder in order to produce the insert seats. This prior art tool holder was particularly undesirable from the standpoint that the retaining screw for holding the insert in the holder had to be completely removed in order to remove or index the insert so as to expose a fresh cutting edge. The necessity for completely removing the retaining screw naturally introduced delays in the machining process thereby unnecessarily increasing the production costs of the workpiece being machined. This problem is aggrevated by the fact that tool holders are often surrounded by other operating parts of the machine, or by the workpiece itself; under these circumstances, the machine operator may have access to the tool holder but may not have visual contact therewith during the removal or indexing of the cutting insert. Thus, the machine operator is working "blind" on the tool holder; this further contributes to machine downtime, and increases the risk that the operator may accidentally drop or lose certain components of the holder during removal or indexing of the cutting insert.

Known prior art tool holders of the type described above are not provided with means for breaking a chip as it is cut from a workpiece by the cutting insert. Although chip breakers are old per se in the art, these devices are normally retrofit to tool holders, thereby adding to the cost of the cutting tool and complicating its overall design.

Accordingly, it is a primary object of the present invention to provide an improved cutting tool which includes a simple tool holder which is economical to manufacture but yet which allows rapid, reliable removal and/or indexing of a cutting insert held thereby.

Another object of the invention is to provide a cutting tool holder as described above which reduces the number of component parts required to reliably hold a cutting insert, and which reduces the overall amount of material required to manufacture the same.

A further object of the invention is to provide a cutting tool holder of the type described above which provides a chip breaker formed integral therewith which is highly effective in breaking chips as they are cut from a workpiece.

A still further object of the invention is to provide a holder as described above which provides selflocating and positive seating of the cutting insert in the holder, even under blind installation conditions.

These and further object of the invention will be made clear or will become apparent during the course of the following description of a preferred embodiment of the invention.

DETAILED DESCRIPTION OF THE INVENTION

A cutting tool comprises a cutting tool holder adapted for releasably holding a cutting tool insert having a plurality of cutting edges which may be indexed within the holder so as to be successively exposed in cutting relationship to a workpiece. The cutting tool holder comprises an elongate body having a bifurcated end defining a pair of spaced apart, tool gripping members. The tool gripping members include a pair of opposed, spaced apart contoured faces forming a tool receiving slot for receiving the cutting insert therebetween. The contoured faces of the gripping members include relieved surface areas defining a pair of retaining walls which extend transverse to each other for complementally abutting adjacent cutting edges of the insert so as to prevent rotation of the cutting insert relative to the holder. The tool holder is provided with a clamping screw which passes through each of the gripping members and is operated to clamp the gripping members on the cutting insert in a vise like fashion. The holder is further provided with an inclined chip breaking face adjacent the exposed cutting edge of the insert and is operative to deflect and thereby break chips emanating from the workpiece being machined. The retaining walls cooperate with a tool receiving opening in one end of the holder defining the slot in order to form a self-locating pocket in the holder which allows the insert to be easily removed and quickly replaced, even under blind installation conditions, without the need for removing the clamping screw.

BRIEF DESCRIPTION OF THE DRAWINGS

In the drawings, which form an integral part of the specification and are to be read in conjunction therewith, and in which like reference numerals are employed to designate like components in the various views:

FIG. 1 is an exploded, perspective view of the cutting tool and holder therefor which form the preferred embodiment of the present invention;

FIG. 2 is a fragmentary view showing one side of the head portion of the cutting tool shown in FIG. 1;

FIG. 3 is a view similar to FIG. 2 but showing a plan view of the head portion; and FIG. 4 is a view similar to FIG. 2 but showing the other side of the head portion, with the clamping screw and cutting insert having been removed from the tool holder.

DESCRIPTION OF THE PREFERRED EMBODIMENT

Referring to the drawings, the cutting tool of the present invention broadly comprises a cutting tool holder 10 adapted to releasably mount and hold a cutting tool insert 12 therein. Holder 10 comprises an elongate, generally cylindrical body which includes a shaft portion 14 and a head portion 16 on one end thereof.

The head portion 16 is somewhat greater in diameter than the shaft portion 14 and is bifurcated to define a pair of spaced apart tool gripping members or jaws 18 and 20 respectively. The spacing between gripping members 18 and 20 defines a tool receiving slot 22 extending around three sides of the head portion 16 and includes a tool receiving opening 24 at the end of the head portion 16. Slot 22 is formed by a pair of opposed, spaced apart contoured faces 26 and 28 on the interior of gripping members 18 and 20 respectively. Faces 26 and 28 include triangularly shaped relieved surface areas 30 and 32 which each extend to the front edge 34 of the head portion 16, adjacent one corner thereof. The relieved surface areas 30 and 32 respectively define a pair of tool insert retaining walls 36 and 38 which extend transverse to each other and communicate with the front edge 34.

The relieved surface areas 30 and 32 extend parallel to each other and are inclined with respect to the longitudinal axis of the holder 10 at an angle of approximately five degrees in the preferred form of the invention. Each end of the gripping members 18 and 20 adjacent the front edge 34 are preferably inclined at an angle of approximately 45° with respect to the longitudinal axis of holder 10. The front edge 34 of the gripping member 18 is truncated at one corner thereof, as at 40. Gripping member 18 further includes an essentially flat beveled face 42 extending upwardly from the truncated edge 40.

The tool holder 10 is preferably manufactured by machining a bar of high strength steel. The contoured surfaces of the faces 26 and 28, including the relieved surface areas 30 and 32 may be simply formed by making a series of cuts completely through the head portion 16 of the holder 10. More specifically, the slot 22 and opposing contoured faces 26 and 28 may be produced by three simple through-cuts: the first cut is made perpendicular to the longitudinal axis of the holder 10, and the remaining two cuts are made at oblique angles to such longitudinal axis and respectively form the relieved surface areas 30 and 32. Thus, it may be appreciated that manufacture of the holder 10 is extremely simple, and therefore highly economical.

The head portion 16 of the holder 10 is provided with a threaded bore 44 therein, which extends through gripping members 18 and 20, as well as through the slot 22. The threaded bore 44 threadably receives a clamping screw 46 therein. The longitudinal axis of bore 44 and screw 46 is spaced from the tool insert retaining walls 36 and 38, as best shown in FIG. 3.

The cutting tool insert 12 is triangular in shape and presents three cutting edges along the respective sides thereof. The edges of cutting tool insert 12 form an angle essentially equal to the angle formed by the intersection of retaining walls 36 and 38, when viewed in plan as shown in FIG. 3. The relieved surface areas 30 and 32 form, in combination with opposing surface portions of the faces 26 and 28, an insert receiving pocket within which a portion of the insert 12 may be received. With the insert 12 installed in the insert receiving pocket, two adjacent edges of the insert 12 complementally abut the retaining walls 36 and 38, thereby preventing rotation of the insert 12 relative to the holder 10. One edge 48 of the insert 12 extends outwardly beyond the front edge 34 of the head portion 16, and the truncated edge 40 exposes a cutting corner of the insert 12 along the cutting edge 48. With the insert 12 seated against the retaining walls 36 and 38, tightening of the clamping screw 46 moves the gripping member 18 and 20 toward each other thereby causing the opposing faces 26 and 28 to tightly grip opposing sides of the gripping element 12 thus holding the latter in a cutting position at a desired cutting angle.

In use, the shaft portion 14 of the holder 10 is mounted on a machine tool and a workpiece is brought into cutting relationship to the cutting corner of the insert 12. Chips formed by the cutting action of the insert 12 are directed toward the beveled face 42 which engages such chips and deflects the same outwardly away from the insert 12, thereby breaking up such chips and preventing relatively long chips from forming. In order to remove the insert 12, or if it is desired to simply index the same, i.e. rotate the insert 12 such that an alternate cutting edge is presented along the front edge 34, the clamping screw 46 is loosened whereupon gripping members 18 and 20 spring away (by virtue of their natural resiliency) from the cutting insert 12 so that the latter may be removed from the pocket between members 18 and 20 and removed or indexed as desired.

From the foregoing, it may be appreciated that the tool holder and cutting tool insert described above not only provide for the reliable accomplishment of the objects of the invention, but do so in a particularly simple and economical manner. It is recognized, of course, that those skilled in the art may make various modifications or additions to the preferred embodiment chosen to illustrate the invention without departing from the scope and spirit of the present contribution to the art. Accordingly, it is to be understood that the protection sought and to be afforded hereby should be deemed to extend to the subject matter claimed and all equivalents thereof fairly within the scope of the invention.

Having thus described the invention, what is claimed is:

1. A cutting tool holder adapted for holding a cutting tool having a cutting face, comprising:
    an elongate body having a pair of gripping members on one end thereof and having opposed, spaced apart faces for gripping said cutting tool therebetween,
    one of said gripping members including a pair of outer edges extending toward each other and a third outer edge connecting said pair of edges to define a truncated corner, said cutting face extending outwardly beyond said truncated corner,
    said gripping members being provided with relieved surface areas in the respective faces thereof defining a pair of retaining walls extending transverse to each other, one of said retaining walls communicating with said third outer edge,
    said gripping member further including a chip breaking surface at said truncated corner and inclined with respect to said cutting face, said chip breaking surface having a height above said cutting face sufficient to engage a substantial portion of the length of a chip being cut by said cutting tool so as to deflect said chip.

2. The cutting tool holder of claim 1, wherein said chip breaking surface is substantially coextensive with said third edge of said one gripping member.

3. The cutting tool holder of claim 1, wherein said chip breaking surface is substantially flat.

* * * * *